United States Patent
Kitch et al.

(10) Patent No.: US 6,247,842 B1
(45) Date of Patent: Jun. 19, 2001

(54) METHOD OF WAFER TEMPERATURE MEASUREMENT

(75) Inventors: Vassili M. Kitch, San Ramon; Kevin C. Brown, Sunnyvale; Joost J. Vlassak, Palo Alto, all of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/334,147

(22) Filed: Jun. 15, 1999

(51) Int. Cl.[7] .............................. G01K 15/00; G01K 7/16
(52) U.S. Cl. .................................. 374/183; 374/1
(58) Field of Search .................. 374/183, 1, 178, 374/185; 438/17, 18

(56) References Cited

U.S. PATENT DOCUMENTS

| | | | |
|---|---|---|---|
| 4,764,026 | * 8/1988 | Powell et al. | 374/178 |
| 5,435,646 | * 7/1995 | McArthur et al. | 374/185 |
| 5,902,504 | * 2/2000 | Merchant et al. | 374/178 |
| 5,970,313 | * 10/1999 | Rowland et al. | 438/17 |
| 5,997,174 | * 12/1999 | Wyland | 374/43 |
| 6,022,142 | * 2/2000 | Hibino | 374/178 |
| 6,065,869 | * 5/2000 | Lin et al. | 374/183 |

* cited by examiner

Primary Examiner—G. Bradley Bennett
Assistant Examiner—Gail Verbitsky
(74) Attorney, Agent, or Firm—Skjerven Morrill MacPherson LLP; Edward C. Kwok

(57) ABSTRACT

A method for determining the temperature of a wafer during processing is disclosed. A test wafer is specially prepared in conjunction with a calibration chart. The difference in stack sheet resistance of the test wafer before and after processing is plotted onto the calibration chart to determine the temperature of the test wafer during processing.

8 Claims, 2 Drawing Sheets

METHOD OF WAFER TEMPERATURE MEASUREMENT

BACKGROUND OF THE INVENTION

1. Field of the Invention

This invention relates to methods for measuring the temperature of a semiconductor wafer.

2. Description of the Related Art

In semiconductor device fabrication, the temperature of the wafer and temperature uniformity across the wafer during processing are important parameters. Semiconductor material properties such as stress, dielectric constant, density, and resistivity depend on the wafer processing temperature. Thus, it is critical for the semiconductor manufacturing equipment to maintain the wafer's temperature during processing at the level specified in the process recipe. Uncontrolled wafer temperature will result in material properties shift, thereby rendering the device defective.

In typical semiconductor manufacturing equipment, such as chemical vapor deposition (CVD) reactors, the wafer's temperature during processing can be determined indirectly by measuring the chuck or pedestal temperature. As shown in FIG. 1, wafer 1 is supported by pedestal 2 during processing in a reactor. To improve heat transfer, helium or argon gas is flowed in-between wafer 1 and pedestal 2. Temperature sensor 3, which could be a thermocouple, measures the temperature of pedestal 2. The output of temperature sensor 3 is used by temperature controller 4 to determine if adjustments are required to maintain the temperature of wafer 1 within the range specified in the process recipe. Because the temperature of wafer 1 is not being measured directly, the temperature of pedestal 2 is assumed to be the same as that of wafer 1. In reality, however, the temperature difference between wafer 1 and pedestal 2 could range from 10° to 50° C. because of inefficient heat transfer.

In high density plasma chemical vapor deposition (HDP CVD) reactors, such as those manufactured by Applied Materials Inc. of Santa Clara, Calif. and Novellus Systems of San Jose, Calif., the problems associated with measuring pedestal temperature to determine wafer temperature are exacerbated. In conventional CVD reactors, heat is transferred from the pedestal to the backside of the wafer. In contrast, in HDP CVD reactors, heat is transferred from the plasma, to the active side of the wafer, and then to the pedestal. Thus, in an HDP CVD reactor, the top or active side of the wafer is at a higher temperature than the pedestal and depends on various parameters such as RF power, reactant gas flows, backside gas flows, and chamber pressure, making it more difficult to determine the wafer's process temperature by simply taking measurements on the pedestal.

Measuring wafer process temperature directly is not only costly but also poses its own set of technical difficulties. One way of measuring wafer temperature directly is to use a pyrometer. To employ a pyrometer, however, requires that the backside emissivity of the wafer be accurately and precisely modeled; a task which is costly, error-prone, and time consuming. Another way of directly measuring the temperature of the wafer during processing is to attach a thermocouple on the backside of the wafer. Direct temperature measurement using a thermocouple does not give accurate readings because reliable and repeatable physical connection to the backside of the wafer is necessary. Further, for both the pyrometer and thermocouple methods, only the temperature of a single point on the wafer is measured. Measuring temperature uniformity across the wafer using a pyrometer or thermocouple is costly, difficult, and practically unfeasible. And because pyrometer and thermocouple temperature measurements are taken on the backside of the wafer while the actual devices are on the top or active side, there is an inherent inaccuracy in the measurement. Positioning sensors to allow taking temperature measurements on the active side of the wafer is often times difficult, if not impossible, because the wafer's active side is exposed to plasma and process gases.

Thus, there is a clear need for an accurate, repeatable, and practical method for determining the wafer's temperature and temperature uniformity during semiconductor processing.

SUMMARY OF THE INVENTION

The present invention provides for a method of determining a wafer's temperature and temperature uniformity during a semiconductor manufacturing process. In one embodiment of the invention, the stack sheet resistance of a test wafer is measured before any processing is performed on same. The test wafer is then processed. The stack sheet resistance of the test wafer before and after processing is used in conjunction with a calibration chart to determine the temperature of the wafer during processing.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present invention provides for a novel method of determining the temperature of a wafer during semiconductor processing.

Figure 1:
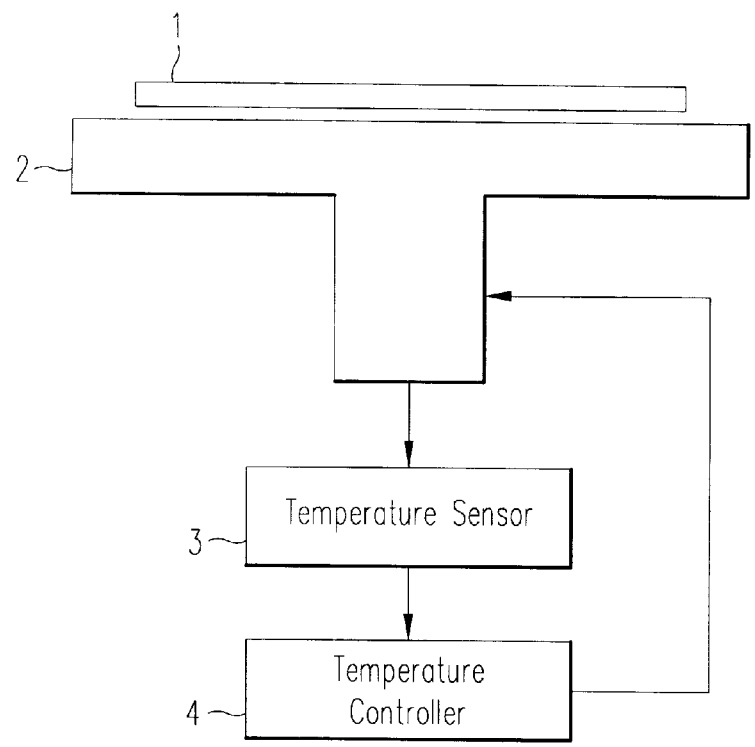
FIG. 1 is a functional diagram of a system in the prior art for determining wafer process temperature.
Figure 2:
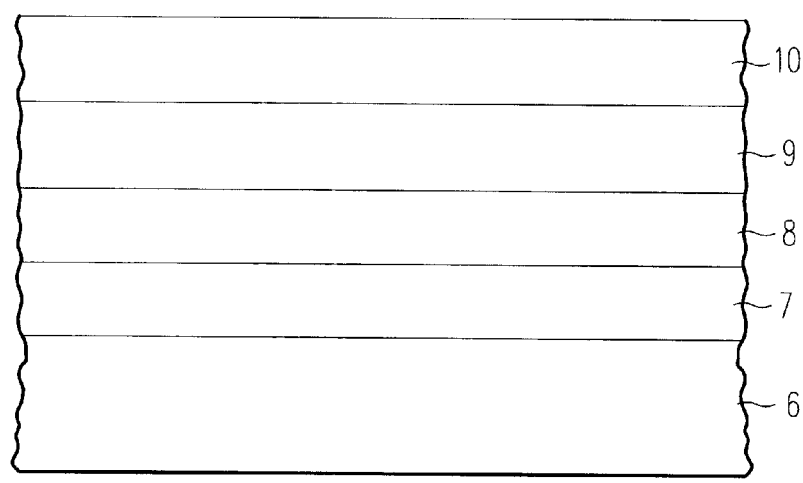
FIG. 2 shows a cross-section of a test wafer fabricated in accordance with the present invention.

In one embodiment of the invention, a test wafer is prepared as shown in FIG. 2. Test wafer 5 has 3500 A of $SiO_2$ (silicon dioxide) layer 7 deposited on top of substrate 6. Test wafer 5 also has 500 A of titanium layer 8, 2000 A of aluminum layer 9, and 300 A of titanium nitride layer 10. Layers 7 to 10 are deposited in sequence and over the entire wafer. Layer 9 can be aluminum or any of its alloys. To ensure good temperature measurement resolution, the interface between layers must be as clean as possible. The stack sheet resistance of test wafer 5 is measured using a. Model RS55 T/C from Tencor Corp. of San, Jose Calif. before any further processing is performed.

Test wafer 5 is then processed using a target process. The target process is the process during which the wafer's temperature and temperature uniformity need to be determined. Typically, the target process is used in the production line for making actual devices. In this particular example, the target process is an HDP CVD oxide deposition for forming a layer of $SiO_2$. In accordance with the target process recipe, the $SiO_2$ layer is deposited on top of titanium-nitride layer 10 of test wafer 5. The $SiO_2$ deposition is performed for 30 seconds. To return test wafer 5 to its pre-processing structure as shown in FIG. 2, the $SiO_2$ layer is removed using diluted HF(hydrofluoric acid), diluted buffered HF, or dry processing methods such as a plasma of isotropic $SF_6$ (sulfur hexafluoride). Once the $SiO_2$ layer is removed, the stack sheet resistance of test wafer 5 is re-measured.

It is to be noted that titanium layer 8 and aluminum layer 9 are the active materials in test wafer 5. Titanium-nitride layer 10 has negligible effect on stack sheet resistance and is used solely to protect aluminum layer 10 during removal of the $SiO_2$ layer. In applications where the effect of titanium-nitride layer 10 is not negligible, its effect can be modeled and compensated for. Further, one of ordinary skill in the art will appreciate that titanium-nitride layer 10 or the step of removing a deposited material prior to post-measurement of test wafer 5 are not required when the target process does not call for processing which significantly alters the structure of test wafer 5.

Figure 3:
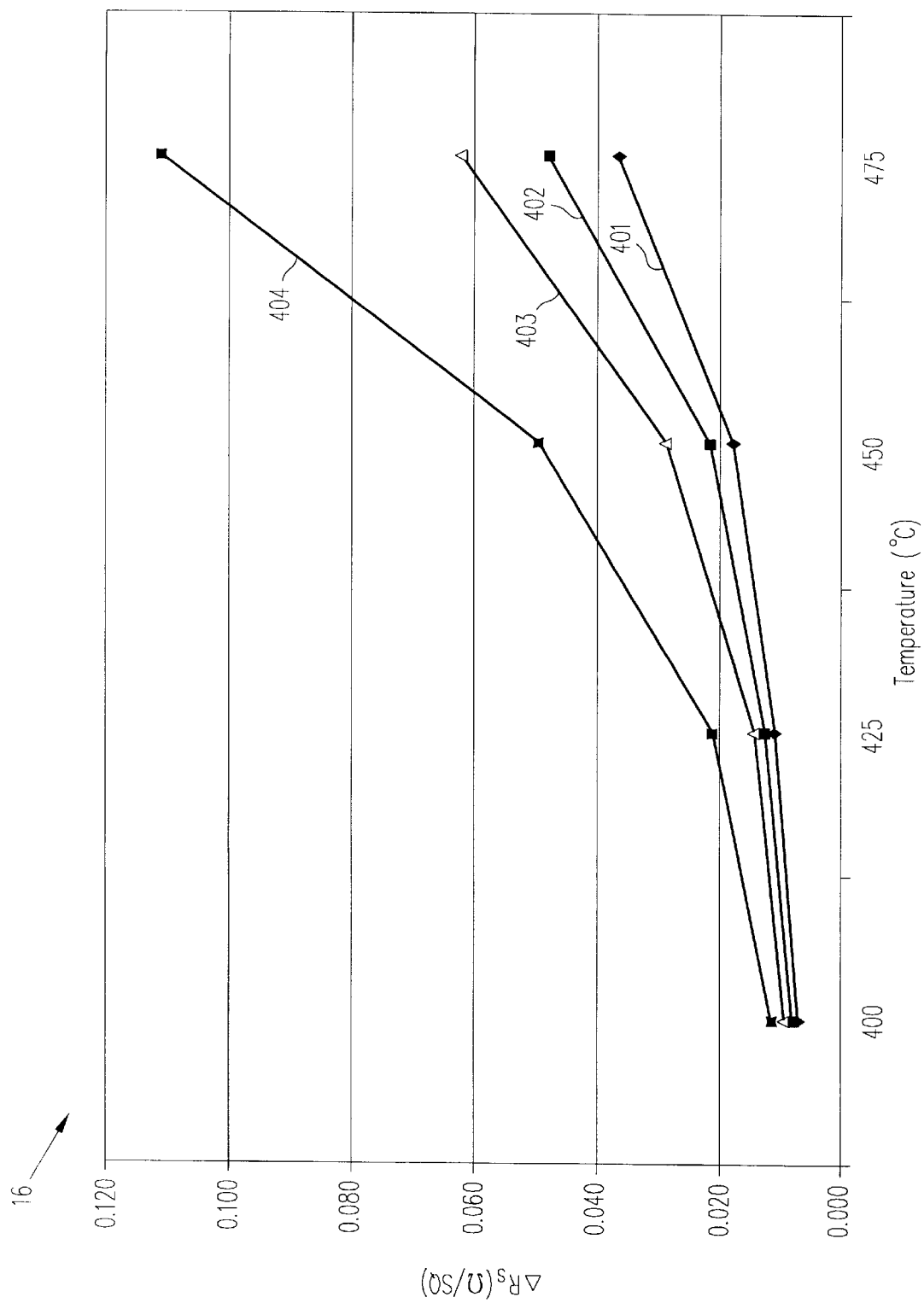
FIG. 3 shows a calibration chart in accordance with the present invention.

The change in the stack sheet resistance of test wafer 5, $\Delta R_S$, is calculated and plotted on a calibration chart 16 which is shown in FIG. 3. In chart 16, $\Delta R_S$ is plotted against process temperature for constant processing times. Lines 401–404 correspond to processing times of 30, 60, 120, and 300 seconds, respectively. If, for example, the stack sheet resistance of test wafer 5 is 0.150 Ω/sq. before the $SiO_2$ deposition and became 0.161 Ω/sq. afterwards, $\Delta R_S$ is 0.011 Ω/sq. (i.e. 0.161−0.0150=0.011). Using chart 16 for a $\Delta R_S$ of 0.011 Ω/sq. and processing time of 30 seconds, an imaginary line (not shown) extending from the vertical axis $\Delta R_S$=0.011 Ω/sq. to line 401 and then down to the temperature axis gives a process temperature of 425° C. Thus, test wafer 5 was exposed to 425° C. during the 30 second $SiO_2$ deposition.

To determine temperature uniformity, the same process can be used for different points across the wafer. For example, the stack sheet resistance of different points across test wafer 5 can be measured before and after processing. The resulting sheet resistivity change for different points across test wafer 5 can then be used to determine temperature uniformity.

It is to be understood that while the above example is for an HDP oxide deposition process, the present invention can be used in any semiconductor processing step wherein the temperature of the wafer during processing needs to be determined. Further, chart 16 is not limited to paper charts but can also be, for example, in the form of a computer program, spreadsheet, database, or mathematical equation.

To determine the wafer process temperature, the invention takes advantage of material resistivity change as a result of inter-diffusion between two materials, chemical reaction between two materials to form a compound, or phase changes in a material upon exposure to elevated temperatures. For example, titanium will diffuse into aluminum at temperatures above 250° C. At temperatures above 350° C., titanium will react with aluminum to form $TiAl_3$. The diffusion and/or reaction of titanium with aluminum will increase material resistivity significantly. For instance, 50 A of titanium in contact with 4500 A of aluminum will increase aluminum resistivity by 5–10% when heated to 400° C.; 200 A of titanium in contact with 4500 A of aluminum will increase aluminum resistivity by as much as 30% when heated to 450° C. While a titanium-aluminum stack can be used for process temperatures of 350°–550° C., test wafer 5 can use different stacks of active materials for different temperature ranges of interest. For example, cobalt-silicon is effective between 450°–800° C. while titanium-silicon can be used for the range 550°–850° C. Measurement resolution near the low temperature limit of a given stack of materials can be improved by increasing the interfacial area between materials by, for example, alternating the layers of active materials or by depositing an active material on top of a patterned active material. The stack of active materials can also be formed on an actual device wafer in lieu of using a test wafer. For a given stack of materials, the delta or change in resistivity for a specific wafer temperature can be plotted to create a temperature calibration chart such as chart 16. Using the same principles as the foregoing, other combination of materials and stacking order may also be used without deviating from the scope and spirit of the invention.

Temperature calibration chart 16 is prepared as follows. A set of experimental wafers, $EW_1$ to $EW_n$, having the same film layers as test wafer 5 are fabricated. The stack sheet resistance of each experimental wafer is measured. Each experimental wafer is then exposed to a pre-determined temperature for a pre-determined amount of time. For example, $EW_1$ can be exposed for 30 seconds to 400° C., $EW_2$ to 425° C., ... $EW_N$ to 475° C. and so on using conventional reactors such as rapid thermal processing (RTP) or furnace equipment. If the target process calls for a 30 second oxide deposition, each experimental wafer must be processed for 30 seconds. For calibration chart 16, experimental wafers are processed for 30, 60, 120, and 300 seconds. Thus, chart 16 can be used for HDP CVD oxide depositions with the aforementioned processing times.

A positive aspect of the invention is that the method used to heat the experimental wafers can be chosen to match the heat transfer mechanism of the target process. For example, RTP is an irradiative technique of heat transfer which could be used for target processes employing irradiation. A vertical furnace can be used to heat experimental wafers in applications where the target process uses convection to heat or cool the wafer. Ideally, the experimental wafers should be heated from the active side of the wafer if the target process is an HDP CVD and from the backside in the case of conventional CVD.

After the experimental wafers are exposed to the temperature range of interest, the stack sheet resistance of each experimental wafer is measured. Using the pre and post exposure stack sheet resistance of each experimental wafer, the change in sheet resistance, $\Delta R_S$, is determined. For chart 16, $\Delta R_S$ is simply the difference between the pre and post stack sheet resistance. Depending on the specific details of the target process and the stack of materials used, $\Delta R_S$ can be computed a number of ways. For example, $\Delta R_S$ can also be represented as the natural logarithm of the ratio of pre and post stack-sheet resistance.

The experimental data used to create calibration chart 16 are shown in Appendix 1. From Appendix 1, a table of $\Delta R_S$ for different temperature and processing times is shown as Table 1 below.

TABLE 1

| TIME | TEMP | | | |
|---|---|---|---|---|
| | 400° C. | 425° C. | 450° C. | 475° C. |
| 30 sec. | 0.007 | 0.011 | 0.018 | 0.036 |
| 60 sec. | 0.008 | 0.012 | 0.021 | 0.048 |
| 120 sec. | 0.009 | 0.014 | 0.029 | 0.062 |
| 300 sec. | 0.011 | 0.021 | 0.049 | 0.111 |

As is evident from the foregoing, the present invention allows for determining the temperature on the active or device side of the wafer. The determined temperature also reflects the highest temperature the wafer is exposed to during processing. The highest wafer process temperature is an important parameter in device fabrication because it relates to electro-migration, $\sqrt{Dt}$ of the device (which typically relates to diffusivity of front end implants), interface integrity between dissimilar materials, and creation of temperature sensitive defects.

It is to be understood that the description of the invention given above is for purposes of illustration and is not intended to be limiting. Numerous variations are possible without deviating from the scope and spirit of the invention. The invention is set forth in the following claims.

Appendix 1

Notes (1) All stack sheet resistivity are in $\Omega$/sq.
(2) Pre-Bake refers to the resistivity of the experimental wafer before the wafer is exposed in a reactor.
(3) Post-Bake refers to the resistivity of the experimental wafer after the wafer is exposed to the corresponding temperature within the reactor.
(4) $\Delta R_S$ is the change in resistivity of the experimental wafer. In this experiment, $\Delta R_S$=Post-Bake−Pre-Bake.

| Exposure Time = 30 seconds | | | | |
|---|---|---|---|---|
| | Temp | Pre-Bake | Post-Bake | $\Delta R_S$ |
| $EW_1$ | 400° C. | 0.151 | 0.0158 | 0.007 |
| $EW_2$ | 425° C. | 0.150 | 0.161 | 0.011 |
| $EW_3$ | 450° C. | 0.150 | 0.167 | 0.018 |
| $EW_4$ | 475° C. | 0.150 | 0.186 | 0.036 |

| Exposure Time = 60 seconds | | | | |
|---|---|---|---|---|
| | Temp | Pre-Bake | Post-Bake | $\Delta R_S$ |
| $EW_5$ | 400° C. | 0.150 | 0.158 | 0.008 |
| $EW_6$ | 425° C. | 0.150 | 0.162 | 0.012 |
| $EW_7$ | 450° C. | 0.150 | 0.171 | 0.021 |
| $EW_8$ | 475° C. | 0.150 | 0.198 | 0.048 |

| Exposure Time = 120 seconds | | | | |
|---|---|---|---|---|
| | Temp | Pre-Bake | Post-Bake | $\Delta R_S$ |
| $EW_9$ | 400° C. | 0.150 | 0.159 | 0.009 |
| $EW_{10}$ | 425° C. | 0.150 | 0.164 | 0.014 |
| $EW_{11}$ | 450° C. | 0.150 | 0.179 | 0.029 |
| $EW_{12}$ | 475° C. | 0.149 | 0.211 | 0.062 |

| Exposure Time = 300 seconds | | | | |
|---|---|---|---|---|
| | Temp | Pre-Bake | Post-Bake | $\Delta R_S$ |
| $EW_{13}$ | 400° C. | 0.150 | 0.161 | 0.011 |
| $EW_{14}$ | 425° C. | 0.150 | 0.171 | 0.021 |
| $EW_{15}$ | 450° C. | 0.150 | 0.199 | 0.049 |
| $EW_{16}$ | 475° C. | 0.149 | 0.260 | 0.111 |

What is claimed is:

1. A method of determining the process temperature of a semiconductor wafer comprising:

(a) making a first measurement of sheet resistance of said wafer;

(b) processing said wafer within a reactor;

(c) making a second measurement of sheet resistance of said wafer; and (d) determining the temperature of said wafer during processing on an active or device side of the wafer within said reactor from the difference between said first measurement and said second measurement.

2. The method of claim 1 wherein said first and second measurements measure the stack sheet resistance of said wafer.

3. The method of claim 2 wherein determining comprises using said first and second measurements in conjunction with a temperature calibration data.

4. The method of claim 2 wherein said wafer comprises a titanium-aluminum stack.

5. The method of claim 2 wherein said wafer comprises a titanium-silicon stack.

6. The method of claim 2 wherein said wafer comprises a cobalt-silicon stack.

7. The method of claim 1, wherein the difference between the first and second measurements is represented as the natural logarithm of the ratio of the first and second measurements.

8. A method of determining the process temperature of a semiconductor wafer comprising the steps of:

step for measuring a first sheet resistance of the wafer;

step for processing said wafer within a reactor;

step for measuring a second sheet resistance of said wafer; and, step for determining the temperature of said wafer during processing in said reactor on an active or device side of the wafer from the difference between said first measurement and said second measurement.

* * * * *